United States Patent [19]

Katano et al.

[11] Patent Number: 5,138,014

[45] Date of Patent: Aug. 11, 1992

[54] SILICATE COMPOUND MODIFIED BY HYDROXYL CONTAINING COMPOUNDS

[75] Inventors: Hiroaki Katano, Machida; Tetsuya Tanaka, Yokohama; Takayuki Ohta, Sagamihara; Takeshi Sawai, Kitakyushu, all of Japan

[73] Assignees: Mitsubishi Kasei Corporation; Dow Mitsubishi Kasei Limited, both of Tokyo, Japan

[21] Appl. No.: 566,457

[22] PCT Filed: Dec. 19, 1989

[86] PCT No.: PCT/JP89/01276

§ 371 Date: Aug. 20, 1990

§ 102(e) Date: Aug. 20, 1990

[87] PCT Pub. No.: WO90/06962

PCT Pub. Date: Jun. 28, 1990

[30] Foreign Application Priority Data

Dec. 20, 1988 [JP] Japan ................... 63-321404

[51] Int. Cl.$^5$ .................................................. C08G 77/02
[52] U.S. Cl. ........................................ 528/29; 528/33
[58] Field of Search .................................... 528/33, 29

[56] References Cited

U.S. PATENT DOCUMENTS

| | | | |
|---|---|---|---|
| 4,211,567 | 7/1980 | Dittrich et al. | 106/38.35 |
| 4,368,294 | 1/1983 | Deubzer et al. | 528/29 |
| 4,501,872 | 2/1985 | Chang et al. | 528/29 |
| 4,775,704 | 10/1988 | Nagahori et al. | 523/123 |

FOREIGN PATENT DOCUMENTS

| | | |
|---|---|---|
| 35-15395 | 10/1960 | Japan . |
| 51-17118 | 2/1976 | Japan . |
| 51-37042 | 10/1976 | Japan . |
| 58-225155 | 12/1983 | Japan . |
| 58-225155 | 12/1983 | Japan . |
| 60-42468 | 3/1985 | Japan . |
| 91-3365 | 3/1986 | Japan . |
| 61-55164 | 3/1986 | Japan . |
| 62-104648 | 5/1987 | Japan . |
| 1508020 | 4/1978 | United Kingdom . |

Primary Examiner—John C. Bleutge
Assistant Examiner—M. W. Glass
Attorney, Agent, or Firm—Oblon, Spivak, McClelland, Maier & Neustadt

[57] ABSTRACT

The present invention relates to a novel modified silicate composition obtained by reacting an alkyl silicate or its oligomer with a certain specific active hydrogen-containing compound in a certain specific ratio.

3 Claims, No Drawings

SILICATE COMPOUND MODIFIED BY HYDROXYL CONTAINING COMPOUNDS

TECHNICAL FIELD

The present invention relates to a novel modified silicate composition, and a method for producing a foundry sand mold by using it. Particularly, the present invention relates to an improvement of the method for producing a sand mold using an organic binder and a ceramic binder. The present invention relates to a method for producing a foundry sand mold excellent in strength and having the mold coating operation reduced, by using a uniform composition obtained by mixing a novel modified silicate composition with a polyisocyanate.

BACKGROUND TECHNIQUE

Various methods have been known for the production of foundry sand molds (hereinafter referred to simply as sand molds) to be used for producing various metal cast articles. However, they can be generally classified into the following two methods depending upon the types of the binders used. Namely, a method for solidifying foundry sand (hereinafter sometimes referred to simply as sand) composed of e.g. coarse particles of silica sand or zircon sand having a particle size of e.g. at least 325 mesh by an organic binder, or a method of solidifying such sand by an inorganic binder.

Among them, as the former method of using an organic binder, methods of using a resin and a curing agent thereof in combination are is known, including, for example, a method in which a phenol resin or a furnace resin mixed to sand is cured by a strongly acidic curing agent such as sulfuric acid, phosphoric acid, toluene sulfonic acid or xylene sulfonic acid to solidify the sand, a method (a pep set method) wherein three components of a phenol resin, a polyisocyanate and a basic catalyst, are mixed with sand, and the reaction of the phenol resin with the polyisocyanate to form urethane is initiated by this catalyst to solidify the sand, and a method (a renocure method) wherein sand is solidified by utilizing a urethane-forming reaction which takes place by the mixing of three components of an oil-modified alkyd resin, a metal salt of naphthenic acid and a polyisocyanate. As the latter method of using an inorganic binder, a method (an OJ process) wherein a casting mold is formed by solidifying sand with cement, and a method wherein sand is solidified by injecting $CO_2$ gas to sand having sodium silicate contained therein, have been known.

However, in each case, the sand mold prepared by such an organic binder is usually inferior in the strength after pouring a molten metal (hereinafter referred to as "high temperature strength"), and once a molten metal is poured into such a sand mold, the organic binder will burn, and the bond of sand particles tends to loosen, whereby the molten metal will penetrate into sand to cause a so-called penetration trouble To prevent such penetration of the molten metal into the sand mold, it is necessary to apply a mold coating agent containing as a mold coating material graphite, mica powder, charcoal, talc or the like as the main agent, to the portion of the sand mold which will be in contact with the molten metal, by a brush or spray. This mold coating operation constitutes from 30 to 50% of the production cost of the sand mold and thus was a main factor for the cost up of the sand mold.

With respect to this problem, Japanese Examined Patent Publication No. 40617/1988 proposes a material for a mold which is excellent in the high temperature strength and the strength after being left to stand still in the atmosphere at room temperature for a predetermined period (hereinafter referred to as "stand still strength") and which requires no mold coating or a simple mold coating, by adding two components of a ceramic binder (one or more members selected from tetraalkoxysilanes, their hydrolysis.dehydration.-polycondensation products, water-dispersible silica sols and alcohol-dispersible silica sols) and a polyisocyanate as a curing agent for this ceramic binder at the time of the preparation of a sand mold by means of an organic binder and its curing agent.

DISCLOSURE OF THE INVENTION

However, according to this method, for the preparation of a sand mold, in addition to an organic binder and its curing agent which used to be employed, two components of a ceramic binder and its curing agent are additionally added, whereby a new installation for supplying additional reagents is required Further, it is required to uniformly mix four types of chemical reagents to sand in a short period of time at the site of the preparation of the mold, and the operation is cumbersome.

With respect to this problem, the present inventors have considered that if the ceramic binder and the polyisocyanate as its curing agent can be mixed to form one component, the conventional installation may be used without any change or with a slight modification.

Namely, in a case where an organic binder using a polyisocyanate, is employed, the ceramic binder and its curing agent may simply be added and mixed to the polyisocyanate, whereby no change of the installation is required. Also in the case of an organic binder not using the polyisocyanate, the additional component will be only one.

However, among ceramic binders, water-dispersible silica sols and alcohol-dispersible silica sols can not be mixed with a polyisocyanate, because water or an alcohol will react with the polyisocyanate. On the other hand, the tetraalkoxysilanes and their hydrolysis.dehydration.polycondensation products do not react but are incompatible with the polyisocyanate, whereby it is difficult to uniformly mix the mixture of such two materials to foundry sand.

The present inventors have conducted extensive studies to make a tetraalkoxysilane and its hydrolysis.-dehydration.polycondensation product (hereinafter referred to simply as a silicate compound) soluble in a polyisocyanate and have found that a novel modified silicate composition obtained by reacting such a silicate compound with an active hydrogen-containing compound under certain specific conditions, is uniformly soluble in a polyisocyanate and have previously filed Japanese Patent Applications No. 164365/1988 and No. 278159/1988. It is an object of the present invention to provide a method for producing a foundry sand mold excellent in the strength and having the mold coating operation reduced by using this novel modified silicate composition.

Namely, the essence of the present invention relates to a modified silicate composition obtained by reacting a silicate oligomer obtained by hydrolyzing, dehydrating and polycondensing a tetraalkoxysilane at a degree of hydrolysis within a range of from 0 to 65%, with an active hydrogen containing compound having a molecular weight of at least 80 and less than 500 and one functional group, at a ratio of the number of alkoxy groups/the number of active hydrogen atoms within a range of 1 to 15, or with an active hydrogen-containing compound having a molecular weight of at least 500 and at most 2 functional groups, at a ratio of the number of alkoxy groups/the number of active hydrogen atoms within a range of from 10 to 100, and a method for producing a foundry sand mold, which comprises adding and mixing a composition prepared by incorporating the modified silicate composition to a polyisocyanate in an amount of from 1/9 to 9 times by weight, an organic binder and its curing agent to foundry sand.

Now, the present invention will be described in detail.

To obtain the modified silicate composition of the present invention, a tetraalkoxysilane of the following formula or its oligomer is used:

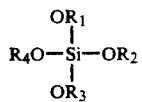

(wherein $R_1$ to $R_4$ which may be the same or different, are an alkyl group such as methyl, ethyl or butyl.)

The silicate oligomer is obtained by hydrolyzing, dehydrating and polycondensing the above tetraalkoxysilane monomer. This reaction is as identified in the following formula (I). The preparation of the oligomer is conducted by adding acidic, neutral or alkaline water to the tetraalkoxysilane monomer in a necessary amount and removing the resulting alcohol (which forms in two mol times of the added water). The degree of hydrolysis of the silicate oligomer is a value calculated in accordance with the following formula (II), and the amount of water to be added will be determined depending upon the desired degree of hydrolysis.

$$m\text{Si}(OR)_4 + mn\text{H}_2\text{O} \rightarrow (\text{Si}(OR)_{4-2n}O_n)_m + 2mn\text{ROH} \quad (I)$$

$$\text{Degree of hydrolysis (\%)} = \frac{2n}{4} \times 100 = \frac{n}{2} \times 100 \quad (II)$$

(wherein, n represents a number of from 0 to 2, and m is an integer, preferably from 2 to 30).

Namely, in the case where all alkoxy groups of the tetraalkoxysilane have been hydrolyzed, the degree of hydrolysis is 100%, and in the case where two alkoxy groups have been hydrolyzed, the degree of hydrolysis is 50%. The degree of hydrolysis is possible up to 100%. However, the 100% hydrolyzate is complete solid of $SiO_2$; a product wherein the degree of hydrolysis exceeds 70%, is a gel like gelatin, or solid; and a product wherein the degree of hydrolysis is from 65 to 70%, is highly viscous and is likely to react with moisture present in a small amount in air and will be gelled, whereby the storage stability is poor and handling is very difficult. Accordingly, in the present invention, a tetraalkoxysilane monomer (i.e. the degree of hydrolysis:0) or a silicate oligomer having a degree of hydrolysis of up to 65%, preferably a silicate oligomer having a degree of hydrolysis of from 10 to 60%, more preferably from 40 to 60%, is employed. Such material will generally be referred to as a silicate oligomer having a degree of hydrolysis of from 0 to 65% or simply as a silicate oligomer.

To make such a silicate oligomer soluble in a polyisocyanate, it is reacted with a) an active hydrogen-containing compound having a molecular weight of at least 80 and less than 500 and one functional group, in a ratio of the number of alkoxy groups/the number of active hydrogen atoms within a range of from 1 to 15, or b) an active hydrogen-containing compound having a molecular weight of at least 500 and at most 2 functional groups, in a ratio of the number of alkoxy groups/the number of active hydrogen atoms within a range of from 10 to 100. Such active hydrogen-containing compounds to be used in the present invention, include compounds represented by the following I to IV:

(Molecular weight of at least 80 and less than 500)

I: A monohydric alcohol having a molecular weight of 80 and less than 500, preferably a compound having an aromatic ring. For example, phenol, benzyl alcohol, 2-phenoxyethanol, and 2,4-dimethylphenol may be mentioned.

II: A polyether alcohol

The one obtained by adding an alkylene oxide to a monohydric alcohol or to a monobasic carboxylic acid to bring the molecular weight to a level of at least 80 and less than 500. The monohydric alcohol includes, for example, methanol, ethanol, propanol, butanol, phenol, and benzyl alcohol. The monobasic carboxylic acid includes, for example, formic acid, acetic acid, butyric acid and benzoic acid. The alkylene oxide includes, for example, ethylene oxide, propylene oxide, and butylene oxide.

(Molecular weight of at least 500)

III: A polyether alcohol

①  One functional group: the one obtained by adding at least 6 mols, preferably 10 mols, of an alkylene oxide to a monohydric alcohol or to a monobasic carboxylic acid to bring the molecular weight to a level of at least 500, preferably from 500 to 1,500. As the monohydric alcohol, the monobasic carboxylic acid and the alkylene oxide, those indicated in II can be used.

②  Two funolional groups: the one obtained by adding at least 8 mols, preferably at least 10 mols, of an alkylene oxide to a dihydric alcohol or to a dibasic carboxylic acid to bring the molecular weight to a level of at least 500, preferably from 800 to 2,000. The dihydric alcohol includes, for example, ethylene glycol, propylene glycol, butane diol, bisphenol A, hydroquinone, and catechol. The dibasic carboxylic acid includes, for example, maleic acid, succinic acid, adipic acid, phthalic acid, and dimeric acid. As the alkylene oxide, those identified in II can be used.

IV: A polyester alcohol

The one obtained by subjecting a dicarboxylic acid and a dihydric alcohol to esterification reaction to bring the molecular weight to a level of at least 500, preferably from 1,000 to 2,000. The dicarboxylic acid includes, for example, maleic acid, succinic acid, adipic acid, phthalic acid, and dimeric acid. As the dihydric alcohol, alcohols identified in III and those obtained by adding an alkylene oxide to the dihydric alcohol in III, can also be used.

In a case where the active hydrogen compound is a polyether alcohol or a polyester alcohol having three or more functional groups, if it is reacted with the silicate oligomer, the reaction product will be gelled or solidified. Further, in the case of an active hydrogen compound having a molecular weight of less than 80 and one functional group, or in the case of an active hydrogen compound having a molecular weight of less than 500 and two functional groups, the reaction product will be incompatible with the polyisocyanate and will be separated.

In the present invention, the reaction of the active hydrogen-containing compound with the silicate oligomer is conducted:

a) At a ratio of the number of alkoxy groups/the number of active hydrogen atoms within a range of from 1 to 15, preferably from 3 to 15, in the case of an active hydrogen compound having a molecular weight of at least 80 and less than 500 and one functional group, or b) At a ratio of the number of alkoxy groups/the number of active hydrogen atoms within a range of from 10 to 100, preferably from 15 to 80, in the case of an active hydrogen compound having a molecular weight of at least 500 and at most 2 functional groups. Here, the ratio of the number of alkoxy groups/the number of active hydrogen atoms, is the value represented by the following formula:

$$\frac{\text{Number of alkoxy groups}}{\text{Number of active hydrogen atoms}} = \frac{\text{Alkoxy equivalent} \times \text{Amount of silicate oligomer used}}{\text{Active hydrogen equivalent} \times \text{Amount of active hydrogen-containing compound used}}$$

The alkoxy equivalent is the number of alkoxy groups in 1 g of the silicate oligomer. If R in the formula (I) is a methyl group, the alkoxy equivalent will be given as shown in the formula (III):

$$\text{Alkoxy equivalent} = \frac{4 - 2n}{28 + 31 \times (4 - 2n) + 16 \times n} \quad \text{(III)}$$

When the degree of hydrolysis is 40%, n = 0.8. Hence, the alkoxy equivalent will be 0.0208. The active hydrogen equivalent is the number of active hydrogen atoms in 1 g of the active hydrogen-containing compound, and by means of the hydroxyl value, it will be given as shown by the formula (IV):

$$\text{Active hydrogen equivalent} = \frac{\text{Hydroxyl value}}{56110} \quad \text{(IV)}$$

The active hydrogen equivalent of an active hydrogen-containing compound having a hydroxyl value of 112 is 0.0020.

From the foregoing, if the degree of hydrolysis of the silicate oligomer and the hydroxyl value of the active hydrogen-containing compound are known, the reaction ratio of the two reactants will be determined. And, as the reaction method, the following two methods are available.

① A predetermined amount of a silicate oligomer and a predetermined amount of an active hydrogen-containing compound are introduced into a reactor and heated to 60 to 140° C. under a nitrogen atmosphere, and an alcohol resulting from the reaction is removed. It is necessary to conduct the reaction until free active hydrogen is no longer present, i.e. until the amount of the resulting alcohol becomes at least the same molar amount as the number of active hydrogen atoms added. However, the alcohol resulting beyond the same molar amount is an alcohol formed by the condensation of the silicate oligomer itself and should not be removed too much. To remove the alcohol too much, is equivalent to increase the degree of hydrolysis of the silicate oligomer, and if the degree of hydrolysis is increased too much, the entire reaction mixture will be gelled or solidified. Further, a catalyst may or may not be used for the reaction. When used, the catalyst may be a usual esterification catalyst, or ester exchange catalyst. Specifically, an alkyl tin, magnesium acetate, calcium acetate or a titanate may, for example, be used.

② A predetermined amount of a silicate oligomer and a predetermined amount of an active hydrogen-containing compound are introduced into a reactor and heated to from 40° to 120° C. under reduced pressure, and an alcohol resulting from the reaction is removed. With respect to the resulting alcohol and the catalyst, ① applies.

In the present invention, the silicate oligomer and a compound having a molecular weight of at least 80 and less than 500 and containing one active hydrogen atom are reacted at a ratio of the number of alkoxy groups/the number of active hydrogen atoms within a range of from 1 to 15, preferably from 3 to 15. If this ratio is less than 1, the alcohol will remain, and this alcohol will react with an isocyanate group. Therefore, the product can not be mixed with a polyisocyanate. On the other hand, if this ratio exceeds 15, the amount of the active hydrogen-containing compound will be too small that the reaction product will not be soluble in a polyisocyanate. Further, the silicate oligomer and a compound having a molecular weight of at least 500 and one or two active hydrogen atoms, are reacted at a ratio of the number of alkoxy groups/the number of active hydrogen atoms within a range of from 10 to 100, preferably from 15 to 80. If this ratio is less than 10, the amount of the active hydrogen-containing compound will be so much that the reaction product will be gelled or solidified. On the other hand, if this ratio exceeds 100, the active hydrogen-containing compound will be so small that the reaction product will be insoluble in a polyisocyanate.

The modified silicate composition of the present invention obtained by reacting the silicate oligomer and the active hydrogen-containing compound as described above, has a viscosity of from 0.001 to 1,000 poise as measured at 25° C. by means of a rotary viscometer (E Model) manufactured by Tokyo Keiki K.K., and it also has a characteristic that it contains no substantial active hydrogen, as evidenced from the fact that no reaction with an isocyanate took place in the mixing test with an isocyanate in the following Examples. And in the present invention, a preferred modified silicate composition is the one having a viscosity within a range of from 0.001 to 100 poise at 25° C.. The viscosity of a more preferred modified silicate composition is within a range of from 0.01 to 10 poise.

The modified silicate composition of the present invention can be dissolved in various compounds to form compositions having stabilized properties.

Especially when mixed with a polyisocyanate, a uniformly dissolved stable composition can be obtained.

The present invention relates also to a method for producing a foundry sand mold by using at least foundry sand, an organic binder, a curing agent thereof and a modified silicate-containing polyisocyanate composition, as materials for the mold.

The organic binder to be used in the present invention includes various synthetic resins which have been used as organic binders for the preparation of sand molds, such as furfuryl alcohol, a phenol resin or a polyester resin as well as modified or reacted resins thereof, such as a urea.furan resin, a phenol.furan resin, a polyester furnace resin, and a phenol or polyester-isocyanate type resin. These synthetic resins exhibit a function of preventing sand burning as well as improving the stand still strength of the sand mold. However, if the content is small, such a function will be inadequate. On the other hand, if the content is too much, disintegratability of the sand mold will be low, and the cost will be high. Therefore, the binder is used in an amount within a range of from 0.4 to 3% (based on the weight of the sand).

The curing agent for an organic binder varies depending upon the organic binder used. However, those which have been commonly used as curing agents of this type, may be employed. Specifically, strong acids such as sulfuric acid, phosphoric acid, benzene sulfonic acid, toluene sulfonic acid and xylene sulfonic acid, and isocyanates, particularly the same polyisocyanates as used as the modified silicate-containing polyisocyanates, can be used. Generally, if the amount of such a curing agent is less than 0.2% based on the weight of the sand, curing of the organic binder will be inadequate, and if it exceeds 2%, the curing rate will be too fast, whereby it becomes difficult to smoothly conduct the molding operation. Therefore, it is used in an amount within a range of from 0.2 to 2% (based on the weight of the sand).

With respect to the isocyanate type curing agent, it is convenient to use it as incorporated in the modified silicate-containing polyisocyanate composition, as will be described hereinafter.

The polyisocyanate to be used for the modified silicate-containing polyisocyanate composition, is an organic compound having at least two isocyanate groups per molecule, and it includes aliphatic and aromatic polyisocyanate compounds and modified products thereof. The aliphatic polyisocyanates include, for example, hexamethylene diisocyanate, isophorone diisocyanate, dicyclohexyl methane diisocyanate, and methylcyclohexane diisocyanate. The aromatic polyisocyanates include, for example, toluene diisocyanate, diphenylmethane diisocyanate and polymeric diphenylmethane diisocyanate (these include various isomers). The modified products thereof include carbodiimide-modified products and prepolymer-modified products. In the present invention, preferred polyisocyanates are modified products of aromatic polyisocyanates. Particularly preferred are diphenylmethane diisocyanate, polymeric diphenylmethane diisocyanate and modified products thereof.

More specifically, the diphenylmethane diisocyanate is the one having the following structure:

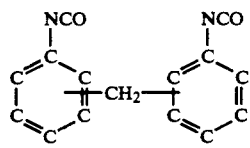

Polymeric diphenylmethane diisocyanate is a polymer of diphenylmethane diisocyanate, which has from 29 to 35% of NCO and a viscosity of at most 2,500 cps (25° C.). The modified products thereof include carbodiimide-modified products and prepolymer-modified products. The carbodiimide-modified products are those obtained by introducing carbodiimide bonds to a polyisocyanate by means of a known phosphorus type catalyst, and the prepolymer-modified products are those obtained by reacting an isocyanate with a polyol to leave isocyanate groups at the terminals. As the polyol for such a prepolymer, all polyols useful for polyurethane resins, can be used.

The modified silicate and the polyisocyanate are mixed in such a proportion as to bring the ratio of the polyisocyanate/the modified silicate to a level of from 90/10 to 10/90 (wt./wt.), preferably from 80/20 to 40/60 (wt./wt.). It is necessary to pay sufficient attention to water for the storage and handling of this composition. Particularly, the modified silicate has a higher reactivity to water than the isocyanate and readily reacts with moisture in air to form insoluble silica ($SiO_2$). Further, other isocyanates, a silicon surfactant and an organic solvent soluble in this composition, may be incorporated.

Further, when the composition is used for a foundry sand mold, if the silica content ($SiO_2$) in the modified silicate-containing polyisocyanate is less than 0.05% by weight relative to the sand, no adequate high temperature strength and stand still strength can be obtained, and it is not possible to omit or simplify the mold coating operation. On the other hand, if it exceeds 2%, the disintegratability of the sand mold tends to be poor. Accordingly, silica content is preferably within a range of from 0.1 to 2% (based on the weight of the sand). The polyisocyanate component is used as a curing agent for the silicate-containing compound as a ceramic binder, in an amount within a range of from 0.06 to 2% by weight relative to the sand. The polyisocyanate is used also as a curing agent for the organic binder. The amount of its use as a curing agent for the organic binder is from 0.2 to 2% by weight of the sand. The polyisocyanate in the modified silicate-containing polyisocyanate may be in such an amount that the amount as a curing agent for the modified silicate and the amount of polyisocyanate as a curing agent for the organic binder are added up.

There is no particular restriction as to the method for producing a foundry sand mold by using these materials for the mold. It can be produced in accordance with a usual method for producing a sand mold. Namely, it is produced by adding and mixing the organic binder, its curing agent and the silicate-containing composition to foundry sand in an optional order, then pouring the mixture into a mold and leaving it to stand. Otherwise, when the organic binder is an isocyanate, the organic binder and the silicate-containing polyisocyanate composition are, in this order or in a reverse order, added and mixed to sand, poured into a mold and left to stand.

Further, at the time of producing the mold, in addition to the sand, the organic binder, its curing agent and the modified silicate-containing polyisocyanate, various additives commonly employed for the production of molds, such as refractory fine powder such as silica alumina and various stabilizers, may be incorporated, so long as they do not hinder the effects of the present invention.

In the present invention, the organic binder added to the foundry sand, will react with the curing agent and cures. In such a case, water or an alcohol will be liberated, although it may vary depending upon the type of the binder. Such water or alcohol will react with the isocyanate to cure the modified silicate-containing polyisocyanate. The foundry sand mold thus obtained is excellent in both the stand still strength and the high temperature strength, and the properties of a cast product prepared by using this mold are excellent. Especially, by using the modified silicate-containing polyisocyanate composition, mold coating will not be required, and it is possible to obtain a cast product having properties equivalent to those obtained by the conventional method where the mold coating is conducted. Further, even in the case where mold coating is required, the operation can be simplified as compared with the case where the organic binder is used alone. When mold coating is required, a mold coating agent containing a powder of graphite, mica or talc as the main agent may be coated by e.g. spray in accordance with a usual method.

According to the present invention, it is possible to produce a foundry sand mold excellent in the stand still strength and the high temperature strength as compared with the method wherein an organic binder is used alone, and when a cast product is prepared by using such a sand mold, it is possible to obtain a cast product having excellent properties, without requiring a cumbersome mold-coating operation. Besides, when the mold is prepared, two components of the organic binder and the silicate-containing polyisocyanate, or in a certain case, three components with a curing agent for the organic binder as an additional component, may simply be added, and accordingly, a conventional apparatus may be used without any change or with a slight modification. Further, the operation will also be simplified as compared with the case where four components are used.

EXAMPLES

Now, the present invention will be described in detail with reference to Examples. However, the present invention is by no means restricted by the following Examples unless it extends beyond the essence of the present invention. In the following Examples, the viscosity is a value measured at 25° C. by means of a rotary viscometer (E Model) manufactured by Tokyo Keiki K.K.

EXAMPLE 1

Tetramethylsilicate oligomer having a degree of hydrolysis of 40% and benzyl alcohol were introduced into a reactor at a ratio of the number of alkoxy groups/the number of active hydrogen atoms =7.5, and heated and reacted at 100° C. under a nitrogen atmosphere. The resulting methyl alcohol was removed by distillation to obtain a modified silicate (viscosity: 0.13 poise). This modified silicate was mixed to a polyisocyanate in various proportions. As shown in Table 1, it was soluble in the polyisocyanate in each case.

○ and ×in Table 1 indicate the solubility as visually evaluated. ○ Indicates "soluble", and ×indicates "separated". The evaluation standard is such that when the modified silicate and the isocyanate are separated to form two layers, such a state is evaluated as "separated". Further, when moisture in air is included during the mixing operation, whereby the modified silicate is hydrolyzed to form solid $SiO_2$ only, such a state is evaluated as "soluble".

EXAMPLE 2

The same compounds as used in Example 1 were introduced into a reactor in the same reaction ratio and heated to from 80° to 100° C. under a reduced pressure of from 3 to 10 mmHg. Methyl alcohol resulting from the reaction was removed to obtain a modified silicate (viscosity: 0.14 poise). The modified silicate thus obtained and isocyanate were mixed, and the results are shown in Table 1.

EXAMPLE 3

Tetramethylsilicate oligomer having a degree of hydrolysis of 40% and a polyether alcohol (molecular weight: 350, hydroxyl value: 160) obtained by adding ethylene oxide (EO) to n-butanol, were reacted in the same manner as in Example 1 to obtain a modified silicate (viscosity: 0.25 poise), the modified silicate thus obtained and isocyanate were mixed The results are shown in Table 1.

EXAMPLE 4

The same compounds as used in Example 1 were reacted in the same manner as in Example 1 at a ratio of the number of alkoxy groups/the number of active hydrogen atoms =4, to obtain a modified silicate (viscosity: 0.18 poise). The modified silicate thus obtained and isocyanate were mixed, and the results are shown in Table 1.

EXAMPLE 5

Tetramethylsilicae oligomer having a degree of hydrolysis of 40% and a polyether polyol (EO/PO=60/40 (mol ratio), molecular weight: 1,400, hydroxyl value: 80) obtained by the addition polymerization of ethylene oxide (EO) and propylene oxide (PO), were introduced into a reactor at a ratio of the number of alkoxy groups/the number of active hydrogen atoms =20 and heated and reacted in a nitrogen atmosphere at 100° C.. The resulting methyl alcohol was removed by distillation to obtain a modified silicate (viscosity: 2.10 poise). This modified silicate and isocyanate were mixed, and the results are shown in Table 1.

EXAMPLE 6

The same compounds as used in Example 5 were introduced into a reactor at the same reaction ratio and heated to from 80° to 100° C. under a reduced pressure of from 3 to 10 mmHg. Methyl alcohol resulting from the reaction was removed to obtain a modified silicate (viscosity: 2.10 poise). The modified silicate thus obtained and isocyanate were mixed, and the results are shown in Table 1.

EXAMPLE 7

Tetramethylsilicate oligomer having a degree of hydrolysis of 50% and a polyether alcohol (molecular weight: 700, hydroxyl value: 80) obtained by adding EO to n-butanol, were reacted under reduced pressure in the same manner as in Example 6 at a ratio of the number of alkoxy groups/the number of active hydrogen atoms =25, to obtain a modified silicate (viscosity: 2.00 poise). The modified silicate thus obtained and isocyanate were mixed, and the results are shown in Table 1.

EXAMPLE 8

Tetramethylsilicate oligomer having a degree of hydrolysis of 40% and a polyester polyol (molecular weight: 2,000, hydroxyl value: 56) obtained by reacting adipic acid and 1,4-butane diol, were reacted under reduced pressure in the same manner as in Example 6 at a ratio of the number of alkoxy groups/the number of active hydrogen atoms =20, to obtain a modified silicate (viscosity: 1.70 poise). The modified silicate thus obtained and isocyanate were mixed, and the results are shown in Table 1.

COMPARATIVE EXAMPLE 1

The same compounds as used in Example 6 were reacted in the same manner as in Example 6 at a ratio of the number of alkoxy groups/the number of active hydrogen atoms =8, whereby the reaction product was gelled in the form of gelatin during the reaction.

COMPARATIVE EXAMPLE 2

The same compounds as used in Example 6 were reacted in the same manner as in Example 6 at a ratio of the number of alkoxy groups/the number of active hydrogen atoms =200, to obtain a modified silicate (viscosity: 0.11 poise). The modified silicate composition thus obtained and isocyanate were mixed, and the results are shown in Table 1.

COMPARATIVE EXAMPLE 3

Tetramethylsilicate oligomer having a degree of hydrolysis of 40% and a polyether polyol (EO/PO =60/40 (mol ratio), molecular weight: 1,000, hydroxyl value: 168) obtained by adding EO and PO to glycerol, were reacted in the same manner as in Example 6 at a ratio of the number of alkoxy groups/the number of active hydrogen atoms =20, whereby the reaction product was gelled in the form of gelatin during the reaction.

COMPARATIVE EXAMPLE 4

Tetramethylsilicate oligomer having a degree of hydrolysis of 68% and the same active hydrogen-containing compound as used in Example 6, were reacted in the same manner as in Example 6 in the same reaction ratio as in Example 6, whereby the reaction product was solidified during the reaction.

COMPARATIVE EXAMPLE 5

Tetramethylsilicate oligomer having a degree of hydrolysis of 40% and a polyether alcohol (molecular weight: 350, hydroxyl value: 160) obtained by adding EO to n-butanol, were reacted in the same manner as in Example 6 at the same reaction ratio as in Example 6, to obtain a modified silicate (viscosity: 0.12 poise). The modified silicate thus obtained and isocyanate were mixed, and the results are shown in Table 1.

In the mixing tests shown in Table 1, in each case, no heat generation or precipitation was observed. From these results, it is considered that no chemical reaction took place, and accordingly, each of the modified silicate compositions does not have active hydrogen.

TABLE 1

| Modified silicate and silicate compound | Results of mixing polyisocyanate[a]/modified silicate | | |
|---|---|---|---|
| | Polyisocyanate/modified silicate (wt/wt) | | |
| | 80/20 | 60/40 | 40/60 |
| Example 1 | O | O | O |
| Example 2 | O | O | O |
| Example 3 | O | O | O |
| Example 4 | O | O | O |
| Example 5 | O | O | O |
| Example 6 | O | O | O |
| Example 7 | O | O | O |
| Example 8 | O | O | O |
| Comparative Example 2 | x | x | x |
| Comparative Example 5 | x | x | x |
| Tetramethyl silicate[b] | x | x | x |
| Tetramethyl silicate oligomer[c] | x | x | x |

[a] Polymeric diphenylmethane diisocyanate Viscosity: 150 cps (25° C.), NCO% 31.3
[b], [c] Non-modified silicate monomer and silicate oligomer

EXAMPLE 9

Foundry sand molds were prepared using the following materials. Modified silicate compositions were prepared in the same manner as in Examples 1 to 8.

Materials a) Organic binder: furfuryl alcohol b) Curing agent for the organic binder: toluene sulfonic acid c) Modified silicate-containing polyisocyanate compositions (hereinafter referred to simply as SH)

Modified silicate compositions

① The one obtained by reacting a tetramethylsilicate oligomer having a degree of hydrolysis of 40% and a polyether polyol (molecular weight: 998, two functional groups) obtained by adding ethylene oxide to bisphenol A, at a ratio of the number of alkoxy groups/the number of active hydrogen atoms =20 ($SiO_2$: 36.5 wt%).

② The one obtained by reacting tetramethylsilicate oligomer having a degree of hydrolysis of 40% and an adipic acid type polyester type polyol (molecular weight: 1,400, two functional groups) at a ratio of the number of alkoxy groups/the number of active hydrogen atoms =20 ($SiO_2$: 32.6 wt%).

③ The one obtained by reacting tetramethylsilicate oligomer having a degree of hydrolysis of 50% and a polyether alcohol (molecular weight: 700, one functional group) obtained by adding ethylene oxide/propylene oxide (40/60 (molar ratio)) to butanol, at a ratio of the number of alkoxy groups/the number of active hydrogen atoms =25 ($SiO_2$: 37.6 wt%).

④ The one obtained by reacting tetramethylsilicate oligomer having a degree of hydrolysis of 40% and benzyl alcohol (molecular weight 108), at a ratio of the number of alkoxy groups/the number of active hydrogen atoms =5 ($SiO_2$: 39.6 wt%).

Polyisocyanate

Polymeric diphenylmethane diisocyanate (viscosity: 1,500 cps/25° C., NCO% 31.3%)

The above modified silicate compositions, the polyisocyanate and tetraethylene chloride (TCE) as a viscosity controlling agent, were mixed at the following proportions to obtain compositions.

Modified silicate composition/polyisocyanate/TCE (wt./wt./wt.)

SH-1: (modified silicate composition ①) 35/50/15

SH-2: (modified silicate composition ②) 32/53/15
SH-3: (modified silicate composition ③) 40/50/10
SH-4: (modified silicate composition ④) 40/50/10 d) Foundry sand: Freemantle, average particle size: 49 μm c) Molten metal: Ductile molten metal, temperature: 1,320° C.

Using the above materials, cast products were produced in the following manner.

20 Kg of foundry sand was put in a sand mixer While rotating the mixer, the curing agent (b) for the organic binder was added in an amount of 0.5% by weight relative to the sand, followed by stirring for from 2 to 3 minutes. Then, the modified silicate-containing polyisocyanate composition (c) was added in an amount of from 1.0 to 2.0% by weight, followed by stirring for from 1 to 1.5 minutes. Finally, the organic binder (a) was added in an amount of 1.0% by weight, followed by stirring for from 1 to 1.5 minutes. Then, the mixer was stopped, and this material for the mold was quickly packed around a model (this model had a size of 120×120×75 tmm) in a metal frame having an inner size of 240×240×165 tmm, shaped and left to stand for one hour. Then, the solidified sand mold was taken out.

Further, for the purpose of comparison, a conventional sand mold was prepared in the following manner without using the modified silicate-containing polyisocyanate composition.

Foundry sand was introduced into a sand mixer. While stirring, the curing agent (b) for the organic binder was added in an amount of 0.5% by weight, followed by stirring for from 2 to 3 minutes. Then, the organic binder (a) was added in an amount of 1.0% by weight, followed by stirring for from 1 to 1.5 minutes. Then, the mixer was stopped, and a sand mold was prepared in the same manner.

Each of the sand molds containing such modified silicate-containing polyisocyanate compositions, was not subjected to mold coating. One of the comparative sand molds was not subjected to mold coating, and another was subjected to mold coating (Diacaston-FA manufactured by Osaka Kasei K.K. was used by diluting it with isopropyl alcohol), and molten metal was poured. Pouring the molten metal was conducted by using Ductile molten metal of 1,320° C., whereby a cast product having a weight of about 5 kg was prepared. Without shot blasting, the surface of the cast product was inspected and evaluated as it was. The results of the evaluation are shown in Table 2. In each case, the evaluation was visually conducted, and an excellent product was identified by ⊚, a good product was identified by ◯, and a poor product was identified by ×. Further, the stand still strength (after being left to stand at room temperature for 24 hours) was measured by an impact penetration tester manufactured by George Fisher Company, and the results of the measurement are shown in Table 2.

TABLE 2

| | Silicate-containing polyisocyanate composition (wt % relative to foundry sand) | Mold coating | Stand still strength (kg/cm²) | Sand Falling a | Texture b | Sand burning | Penetration c | Oozing of resin d | Overall evaluation | SiO₂ (wt %) e |
|---|---|---|---|---|---|---|---|---|---|---|
| Example 1 | SH-1 (1.0) | No | 55 | ◯ | ◯ | ◯ | ◯ | ◯ | ◯ | 0.12 |
| Example | SH-2 (1.0) | No | 52 | ◯ | ◯ | ◯ | ◯ | ◯ | ◯ | 0.09 |
| Example | SH-3 (1.0) | No | 26 | ◯ | ◯ | ◯ | ◯ | ◯ | ◯ | 0.14 |
| Example | SH-3 (1.4) | No | 17 | ◯ | ◯ | ◯ | ◯ | ◯ | ◯~⊚ | 0.18 |
| Example | SH-3 (2.0) | No | 14 | ⊚ | ◯ | ◯ | ◯ | ◯ | ⊚ | 0.28 |
| Example | SH-4 (1.5) | No | 20 | ⊚ | ◯ | ◯ | ◯ | ◯ | ⊚ | 0.23 |
| Comparative Example 1 | | No | 8 | × | × | × | ◯ | ◯ | × | 0 |
| Comparative Example 2 | | Yes | 9 | ◯ | ◯ | ◯ | ◯ | ◯ | ◯ | 0 | a: Falling of the sand when the cast product was taken out from the sand mold (before shot blasting).
b: Free from surface roughness of the surface of the cast product.
c: When molten metal is poured, a part of the sand falls off, and the molten metal penetrate into the cavity and forms a protuberance.
d: Free from oozing out of the resin to the interface of the molten metal and the sand to form roughness or to cause adhesion of the sand.
e: Weight ratio of SiO₂ in the sand mold.

We claim:

1. A modified silicate composition obtained by reacting a silicate oligomer obtained by hydrolyzing, dehydrating and polycondensing a tetralkylsilane at a degree of hydroliss within a range of from 0 to 65%, with
   (a) a compound having a molecular weight of at lest 80 and less than 500 and having one hydroxyl groups oat a ratio of the number of alkoxy groups/the number of hydroxyl groups within a range of from 1:1 to 15:1, or
   (b) a compound having a molecular weight of at least 500 and at most 2 hydroxyl groups, at a ratio of the number of alkoxy groups/the number of hydroxyl groups within a range of from 10:1 to 100:1, said modified silicate composition having a viscosity of rom 0.001 to 1,000 poise at 25° C., and being soluble in polyvisocyanate.

2. The modified silicate composition according to claim 1 obtained by reacting the silicate oligomer with the compound having a molecular weight of at least 80 and less than 500 and one hydroxyl group, at a ratio of the number of the alkoxy groups/the number of hydroxyl groups within a range of from 1:1 to 15:1.

3. The modified silicate composition according to claim 1 obtained by reacting the silicate oligomer with the compound having a molecular weight of at least 500 and at most 2 hydroxyl groups, at a ratio of the number of alkoxy groups/the number of hydroxyl groups within a range of from 10:1 to 100:1.

* * * * *